(12) United States Patent
Kolb

(10) Patent No.: US 7,290,593 B2
(45) Date of Patent: Nov. 6, 2007

(54) HEAT EXCHANGER PACKAGE WITH SPLIT CHARGE AIR COOLER

(75) Inventor: John A. Kolb, Old Lyme, CT (US)

(73) Assignee: Proliance International, Inc., New Haven, CT (US)

( * ) Notice: Subject to any disclaimer, the term of this patent is extended or adjusted under 35 U.S.C. 154(b) by 0 days.

(21) Appl. No.: 11/655,643

(22) Filed: Jan. 18, 2007

(65) Prior Publication Data

US 2007/0114004 A1    May 24, 2007

Related U.S. Application Data

(62) Division of application No. 10/723,879, filed on Nov. 26, 2003, now Pat. No. 7,178,579.

(51) Int. Cl.
| | |
|---|---|
| *F01P 3/18* | (2006.01) |
| *F01P 3/20* | (2006.01) |
| *F01P 11/10* | (2006.01) |
| *F28D 1/04* | (2006.01) |
| *F02B 29/04* | (2006.01) |

(52) U.S. Cl. ............... 165/41; 165/51; 165/140; 165/67; 165/173; 165/176; 60/599; 123/563

(58) Field of Classification Search .......... 165/41, 165/51, 140, 67, 173, 176; 60/599; 123/563
See application file for complete search history.

(56) References Cited

U.S. PATENT DOCUMENTS

| | | |
|---|---|---|
| 4,236,492 A | 12/1980 | Tholen |
| 4,736,727 A | 4/1988 | Williams |
| 4,805,693 A | 2/1989 | Flessate |
| 4,938,303 A | 7/1990 | Schaal et al. |
| 5,046,550 A | 9/1991 | Boll et al. |
| 5,046,554 A | 9/1991 | Iwasaki et al. |
| 5,062,473 A | 11/1991 | Ostrand et al. |
| 5,157,944 A | 10/1992 | Hughes et al. |
| 5,234,051 A | 8/1993 | Weizenburger et al. |
| 5,267,624 A | 12/1993 | Christensen |
| 5,316,079 A | 5/1994 | Hedeen |

(Continued)

FOREIGN PATENT DOCUMENTS

EP    0522288    6/1992

(Continued)

*Primary Examiner*—John K. Ford
(74) *Attorney, Agent, or Firm*—DeLio & Peterson, LLC; Peter W. Peterson

(57) ABSTRACT

A combined radiator and charge air cooler package comprises a radiator for cooling engine coolant, and a charge air cooler for cooling charge air having upper and lower portions. The upper charge air cooler portion is disposed in overlapping relationship and adjacent to the upper end of the radiator, and the lower charge air cooler portion is disposed in overlapping relationship and adjacent to the lower end of the radiator, on the face side thereof. Ambient air may flow in series through the upper end of the radiator and the upper charge air cooler portion, and through the lower charge air cooler portion and the lower end of the radiator. The charge air cooler portions are operatively connected such that the charge air may flow between the lower manifold of the upper charge air cooler portion and the upper manifold of the lower charge air cooler portion.

8 Claims, 6 Drawing Sheets

U.S. PATENT DOCUMENTS

| | | |
|---|---|---|
| 5,353,757 A | 10/1994 | Susa et al. |
| 5,526,873 A | 6/1996 | Marsais et al. |
| 5,566,748 A | 10/1996 | Christensen |
| 5,657,817 A | 8/1997 | Heine et al. |
| 6,196,169 B1 | 3/2001 | Schreiner |
| 6,223,811 B1 | 5/2001 | Kodumudi et al. |
| 6,408,939 B1 | 6/2002 | Sugimoto et al. |
| 6,412,547 B1 | 7/2002 | Siler |
| 6,460,610 B2 | 10/2002 | Lambert et al. |
| 6,615,604 B2 | 9/2003 | Neufang |
| 6,619,379 B1 | 9/2003 | Ambrose et al. |
| 6,957,689 B2 | 10/2005 | Ambrose et al. |
| 2002/0020365 A1 | 2/2002 | Wooldridge |
| 2002/0162648 A1 | 11/2002 | Crook |
| 2003/0106669 A1 | 6/2003 | Ambrose et al. |
| 2004/0104007 A1 | 6/2004 | Kolb |

FOREIGN PATENT DOCUMENTS

| | | |
|---|---|---|
| EP | 0522471 | 7/1992 |
| JP | 11264688 | 9/1999 |

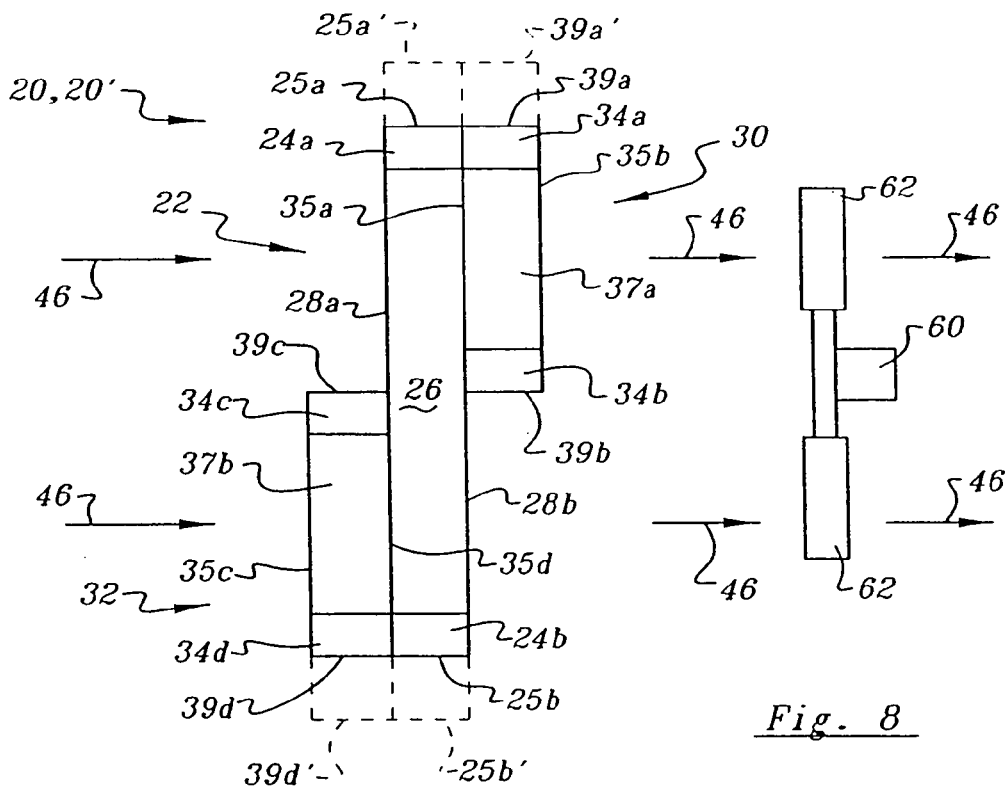
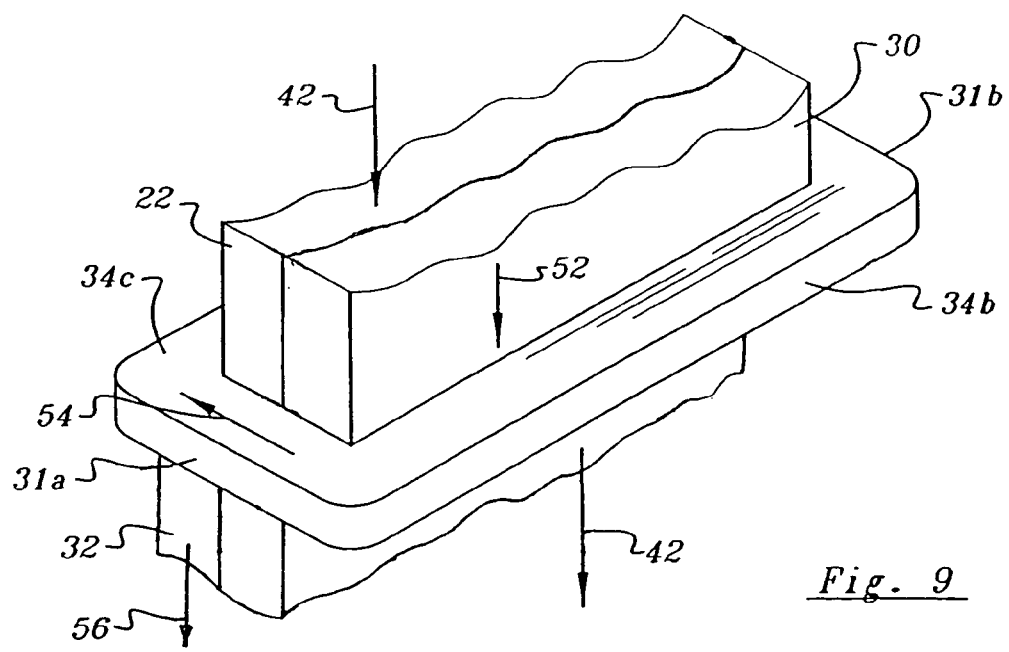

HEAT EXCHANGER PACKAGE WITH SPLIT CHARGE AIR COOLER

BACKGROUND OF THE INVENTION

1. Field of the Invention

The invention relates to heat exchanger devices for cooling fluids used in an engine of a motor vehicle, and more particularly, to a heat exchanger package including a coupled radiator and charge air cooler for an engine of a heavy-duty highway truck or bus.

2. Description of Related Art

Heat exchanger packages comprising a radiator and a charge air cooler, also known as an intercooler, have been used for years in over the road highway trucks and buses and other heavy-duty motor vehicles. The radiators provide cooling for the engine coolant, usually a 50-50 solution of water and anti-freeze. The charge air cooler receives compressed, charge or intake air from the turbo- or super-charger and lowers its temperature before it enters the engine intake manifold, thereby making it denser, improving combustion, raising power output, improving fuel economy and reducing emissions. In order to optimize heat transfer in a given heat exchanger package size, the factors of cooling air flow, heat exchanger core restriction, cooling air flow split and cooling air approach and differential temperature must be balanced.

Numerous configurations of the radiator/charge air cooler heat exchanger package have been disclosed in the prior art. Placing both the radiator and charge air cooler side-by-side, so that the full frontal area of each of the cores are exposed to ambient cooling air, provides the best performance, but requires the largest package frontal area. Limitations in the frontal area of radiator and charge-air cooler heat exchanger packages have been sought in order to accommodate the smaller frontal area of motor vehicles, as a result of improved vehicle aerodynamics. Heat exchanger packages with smaller frontal areas have been disclosed for example in U.S. Pat. No. 4,737,727, U.S. Patent Application Publication No. 2003/0106669, and in U.S. patent application Ser. No. 10/289,513.

In another prior art radiator and charge air cooler heat exchanger package, depicted in FIG. 1, the charge air cooler is split between an upper unit 101 and a lower unit 103, disposed respectively behind and in front of radiator 107 with respect to the direction of air flow 127. Radiator 107 has a conventional downflow-type tube and fin core 117 between upper tank 109a and lower tank 109b. Radiator 107 receives coolant 131 from the engine into upper tank 109a and the cooled engine coolant exits as 133 from the lower portion of lower tank 109b, to be transferred back to the engine. Both charge air cooler units 101, 103 are cross-flow type charge air coolers wherein the compressed charge air is flowed horizontally through the respective tube and fin cores 111, 113. Compressed, heated charge air 121 is first flowed into vertically oriented tank 105a of upper charge air cooler 101, through core 111 in direction 129a, and into vertical tank 105b. In unit 101, the charge air is cooled by air 127 as it exits the upper portion of radiator core 117. Thereafter, the partially cooled compressed charge air 123 is then transferred into vertical tank 105d of lower charge air cooler 103, where it is then flowed in horizontal direction 129b through core 113 and into vertical tank 105c, and thereafter exits 125 and flows to the engine intake manifold. In unit 103, the charge air is cooled by air 127 before it flows through the lower portion of radiator core 117. Notwithstanding its novel design, the heat exchanger package of FIG. 1 did not achieve good performance and did not go into normal production, to the inventor's knowledge. It has now been determined that the performance of heat exchanger package of FIG. 1 suffered in large part due to excessive charge air pressure drop through the two charge air cooler units.

Thus there has been a long-felt need to achieve high performance in cooling both engine coolant and charge air, while observing strict limitations in frontal area of a radiator/charge air cooler heat exchanger package.

SUMMARY OF THE INVENTION

Bearing in mind the problems and deficiencies of the prior art, it is therefore an object of the present invention to provide a combination radiator and charge air cooler which achieves high heat transfer performance with a minimal frontal area.

It is another object of the present invention to provide a heat exchanger package for cooling different fluids which minimizes the pressure loss to the fluids.

It is a further object of the present invention to provide a method of cooling fluids such as engine coolant and charge air used in the engine of a motor vehicle which optimizes heat transfer of those fluids to ambient cooling air.

The above and other objects, which will be apparent to those skilled in art, are achieved in the present invention which is directed to a heat exchanger apparatus comprising a first heat exchanger for cooling a first fluid having opposite front and rear faces through which cooling air flows, opposite first and second ends adjacent the faces, and sides adjacent the faces between the first and second ends. The heat exchanger apparatus also includes a second heat exchanger for cooling a second fluid having two portions. Each second heat exchanger portion has opposite front and rear faces through which cooling air flows, opposite first and second ends adjacent the faces, and sides adjacent the faces between the first and second ends, and includes manifolds at the first and second ends and fluid-carrying tubes extending substantially directly therebetween.

One of the second heat exchanger portions is disposed in overlapping relationship and adjacent to the first end of the first heat exchanger, with the first and second ends of the one of the second heat exchanger portions being oriented in the same direction as the first and second ends of the first heat exchanger. One face at the first end of the first heat exchanger is disposed adjacent one face of the one of the second heat exchanger portions, such that the cooling air may flow in series through the first end of the first heat exchanger and the one of the second heat exchanger portions. The other of the second heat exchanger portions is disposed in overlapping relationship and adjacent to the second end of the first heat exchanger, with the first and second ends of the other of the second heat exchanger portions being oriented in the same direction as the first and second ends of the first heat exchanger. The other face at the second end of the first heat exchanger is disposed adjacent one face of the other of the second heat exchanger portions, such that the cooling air may flow in series through the other of the second heat exchanger portions and the second end of the first heat exchanger. The second heat exchanger portions are operatively connected such that the second fluid may flow between the second manifold of the one of the second heat exchanger portions and the first manifold of the other of the second heat exchanger portions.

The second heat exchanger portions may be operatively connected such that fluid may flow between the second manifold of the one of the second heat exchanger portions and the first manifold of the other of the second heat exchanger portions around at least one side of the first heat exchanger, preferably around both sides of the first heat exchanger. The manifolds of the second heat exchanger portions may extend across the ends thereof, and substantially from one side of the first heat exchanger to the other side of the first heat exchanger.

Preferably, the dimension between the first and seconds ends of the second heat exchanger portions is less than the dimension from one side of the second heat exchanger portions to the other side of the second heat exchanger portions, such that the fluid-carrying tubes extend across the shorter dimension of the faces of the second heat exchanger portions. The first heat exchanger may also include fluid-carrying tubes, with the fluid-carrying tubes of the first heat exchanger extending in the same direction as the fluid-carrying tubes of each of the second heat exchanger portions.

The sides of the first heat exchanger may be adjacent each of the sides of the second heat exchanger portions, and the first end of the first heat exchanger may be adjacent the first end of the one of the second heat exchanger portions and the second end of the first heat exchanger is adjacent the second end of the other of the second heat exchanger portions. The second end of the one of the second heat exchanger portions may be adjacent the first end of the other of the second heat exchanger portions.

The manifolds of the second heat exchanger portions may extend horizontally, such that the second heat exchanger portions are vertically separated, or the manifolds of the second heat exchanger portions may extend vertically, such that the second heat exchanger portions are horizontally separated.

At least one of the sides or ends of the first heat exchanger may extends outward of a side or end of one of the second heat exchanger portions, wherein the first end of the first heat exchanger extends outward of the first end of the one of the second heat exchanger portions. Also, at least one of the sides or ends of one of the second heat exchanger portions may extend outward of a side or end of the first heat exchanger.

Preferably, the first heat exchanger is a radiator for cooling engine coolant and the second heat exchanger is a charge air cooler for cooling charge air, with each of the radiator and the charge air cooler portions being cooled by ambient air. Alternatively, the first heat exchanger is a charge air cooler for cooling charge air and the second heat exchanger is radiator for cooling engine coolant, with each of the charge air cooler portions and the radiator being cooled by ambient air.

In a preferred embodiment, the present invention is directed to a combined radiator and charge air cooler package comprising: 1) a radiator for cooling engine coolant having opposite front and rear faces through which ambient air flows, opposite upper and lower ends adjacent the faces, and sides adjacent the faces between the first and second ends, and 2) a charge air cooler for cooling charge air having upper and lower portions. Each charge air cooler portion has opposite front and rear faces through which ambient air flows, opposite upper and lower ends adjacent the faces, and sides adjacent the faces between the upper and lower ends, and includes manifolds at the upper and lower ends and charge air-carrying tubes extending substantially directly therebetween.

The upper charge air cooler portion is disposed in overlapping relationship and adjacent to the upper end of the radiator with the upper and lower ends of the upper charge air cooler portion being oriented in the same direction as the upper and lower ends of the radiator. One face at the upper end of the radiator is disposed adjacent one face of the upper charge air cooler portion, such that the ambient air may flow in series through the upper end of the radiator and the upper charge air cooler portion. The lower charge air cooler portion is disposed in overlapping relationship and adjacent to the lower end of the radiator with the upper and lower ends of the lower charge air cooler portion being oriented in the same direction as the upper and lower ends of the radiator. The other face at the lower end of the radiator is disposed adjacent one face of the lower charge air cooler portion, such that the ambient air may flow in series through the lower charge air cooler portion and the lower end of the radiator. The charge air cooler portions are operatively connected such that the charge air may flow between the lower manifold of the upper charge air cooler portion and the upper manifold of the lower charge air cooler portion.

In another aspect, the present invention provides a method for cooling fluids used in an engine of a motor vehicle, comprising providing a heat exchanger assembly as described above, flowing the first fluid through the first heat exchanger, and flowing the second fluid through the substantially directly extending tubes of the second heat exchanger portions and between the second manifold of the one of the second heat exchanger portions and the first manifold of the other of the second heat exchanger portions. The method then includes flowing cooling air through the heat exchanger assembly such that the cooling air flows through both the first end of the first heat exchanger and the one of the second heat exchanger portions, and the cooling air flows through both the other of the second heat exchanger portions and the second end of the first heat exchanger, to cool the first fluid in the first heat exchanger and the second fluid in the second heat exchanger portions.

The second fluid may flow in sequence through the second manifold of the other of the second heat exchanger portions, the substantially directly extending tubes of the other of the second heat exchanger portions, the first manifold of the other of the second heat exchanger portions, the second manifold of the one of the second heat exchanger portions, the substantially directly extending tubes of the one of the second heat exchanger portions, and the first manifold of the one of the second heat exchanger portions. The cooling air flows sequentially first through the one of the second heat exchanger portions and subsequently through the first end of the first heat exchanger, and also flows sequentially first through the second end of the first heat exchanger and subsequently through the other of the second heat exchanger portions.

Alternatively, the second fluid flows in sequence through the first manifold of the one of the second heat exchanger portions, the substantially directly extending tubes of the one of the second heat exchanger portions, the second manifold of the one of the second heat exchanger portions, the first manifold of the other of the second heat exchanger portions, the substantially directly extending tubes of the other of the second heat exchanger portions, and the second manifold of the other of the second heat exchanger portions. The cooling air flows sequentially first through the first end of the first heat exchanger and subsequently through the one of the second heat exchanger portions, and also flows sequentially first through the other of the second heat exchanger portions and subsequently through the second end of the first heat exchanger.

Preferably, the first heat exchanger is a radiator and the first fluid is engine coolant, and the second heat exchanger is a charge air cooler and the second fluid is charge air, with each of the radiator and the charge air cooler portions being cooled by ambient air. Alternatively, the first heat exchanger is a charge air cooler and the first fluid is charge air, and the second heat exchanger is a radiator and the second fluid is engine coolant, with each of the charge air cooler portions and the radiator being cooled by ambient air.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIG. 8 is a plan or side elevational view of the radiator/charge air cooler heat exchanger package of the present invention in relation to a cooling fan.

FIG. 9 is a perspective view of a portion of the heat exchanger packages of the present invention showing one embodiment of the connecting manifold between the two charge air cooler units.

DESCRIPTION OF THE PREFERRED EMBODIMENTS

Figure 1:
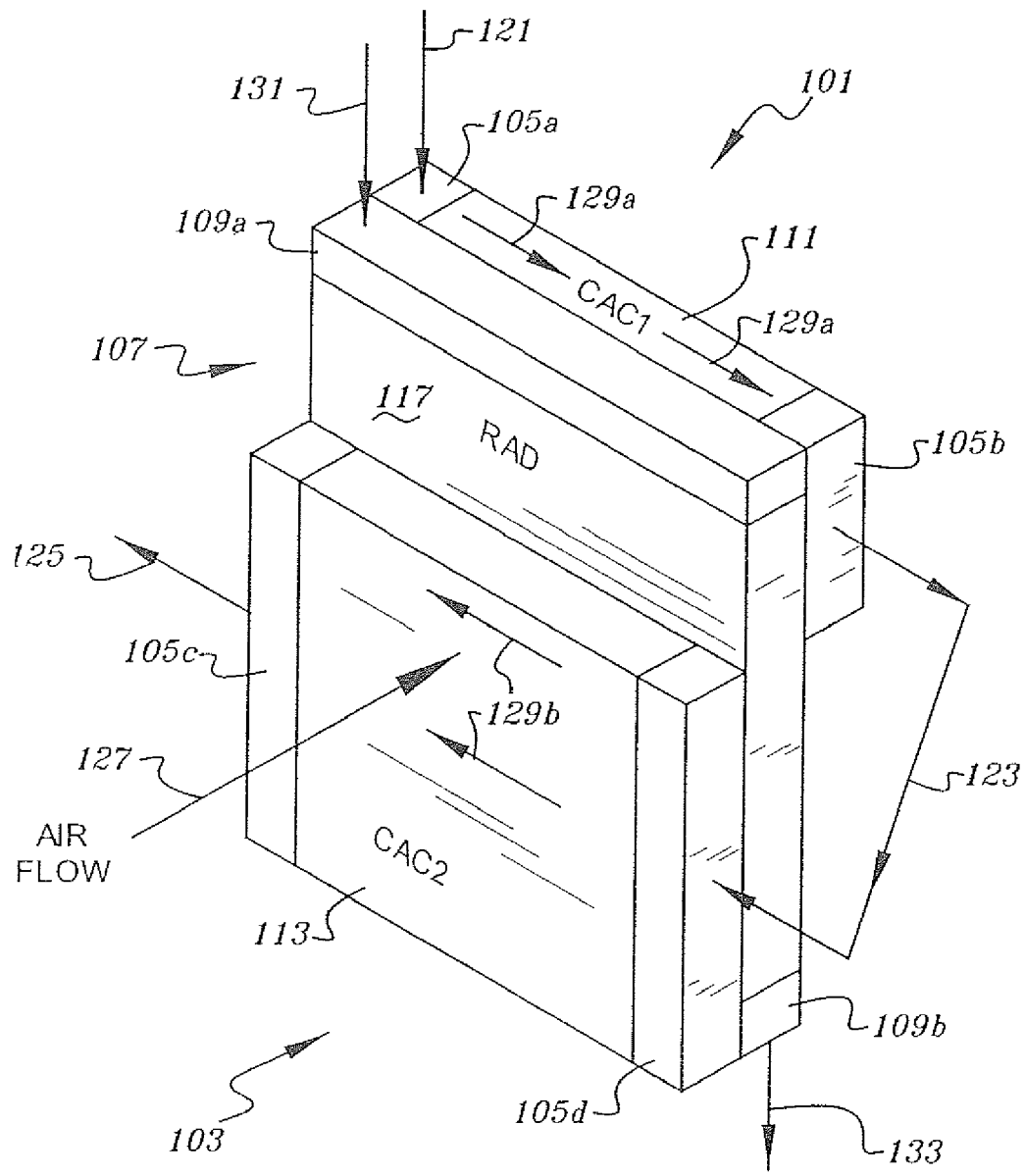
FIG. 1 is a perspective view of a prior art radiator/charge air cooler heat exchanger package.

In describing the preferred embodiment of the present invention, reference will be made herein to FIGS. 2-11 of the drawings in which like numerals refer to like features of the invention.

A first embodiment of the heat exchanger package of the present invention is depicted in FIGS. 2-5. A combined heat exchanger package 20 preferably comprises a first heat exchanger 22 for cooling a first fluid, preferably a radiator for use in cooling liquid engine coolant from a motor vehicle or other internal combustion engine, and another heat exchanger having at least two units or portions 30, 32 for cooling a second fluid, preferably charge air coolers for cooling compressed charge air from a turbo or supercharger of an internal combustion engine. Although engine coolant will be used to exemplify the first fluid, and compressed charge air will be used to exemplify the second fluid, any other fluids may be substituted. Both heat exchangers are normally in an upstanding, essentially vertical position, and are preferably rectangular in shape, and the width and length of the combined heat exchanger package is consistent with the requirements of the truck or bus engine compartments. Radiator 22 of the present invention is preferably a down flow type radiator, wherein engine coolant 40 enters through an upper manifold or tank 24a extending substantially the entire width of the radiator. The coolant is then distributed from manifold 24a into attached core 26 having an otherwise conventional construction, which generally comprises downwardly extending tubes 23 connected by cooling fins (not shown), so that ambient cooling air 46 may flow from the front face 28a of the core through and out of the rear face 28b. After being cooled by the ambient air, the coolant then collects in attached lower manifold or tank 24b also extending across the width of the radiator, and out through the coolant outlet 44 for return to the engine.

The charge air cooler (CAC) of the present invention preferably comprises a split pair of vertically separated units or portions 30, 32. Upper CAC unit 30 is disposed in an overlapping fashion with the upper portion of radiator 22, so that the upper edge and sides of CAC unit 30 are coincident with and behind the upper edge and sides of radiator 22, with respect to the direction of cooling air 46. Front face 35a of CAC unit 30 is abutted to or slightly spaced from rear face 28b of radiator 22. CAC unit 30 contains an upper tank or manifold 34a and a lower tank or manifold 34b and a core 37a attached therebetween, each extending substantially the full width of the charge air cooler unit. Lower CAC unit 32 is positioned in front of the lower portion of radiator 22, with respect to air flow direction 46, and the lower end and sides of unit 32 are coincident with the lower end and lower sides of radiator 22. Rear face 35d of CAC unit 30 is abutted to or slightly spaced from radiator front face 28a. CAC unit 32 contains an upper tank or manifold 34c and a lower tank or manifold 34d and a core 37b attached therebetween, each extending substantially the full width of the charge air cooler unit. Both CAC cores 37a, 37b are conventional tube and fin construction. Lower manifold 34b of CAC unit 30 is operatively connected to upper manifold 34c of CAC unit 32, so that charge air may flow therebetween.

Figure 5:
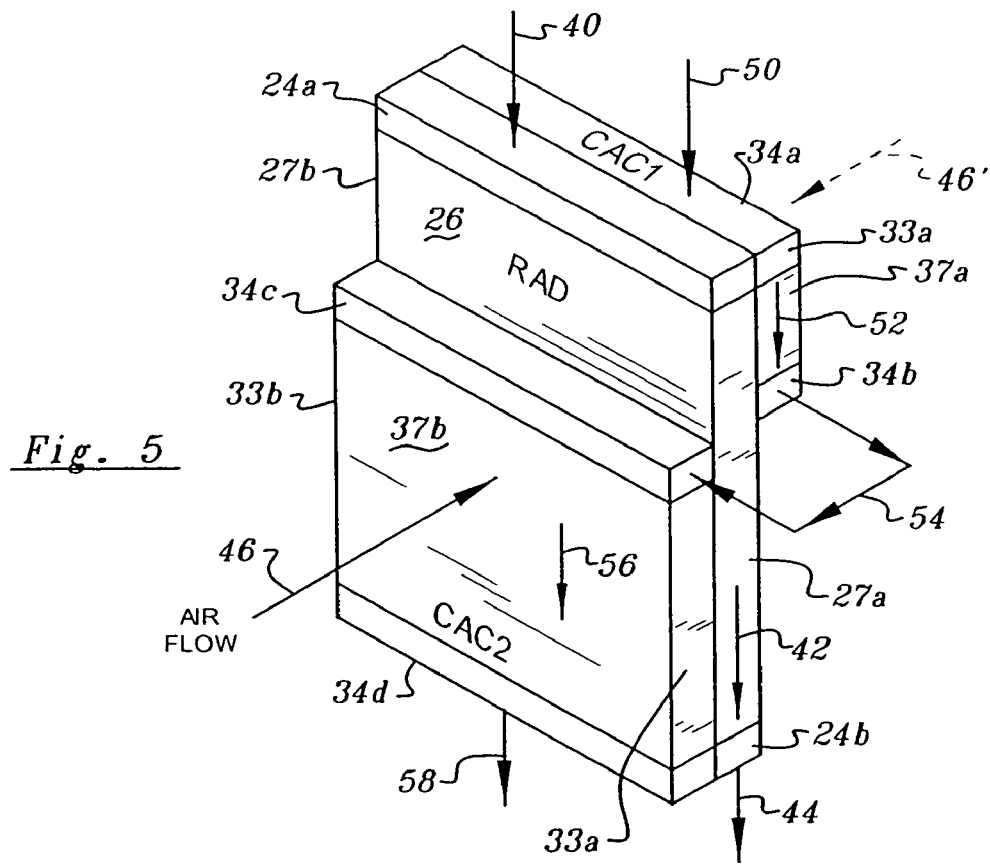
FIG. 5 is a perspective view of the radiator/charge air cooler package of FIG. 2.

Although positioned in superficially similar manner to the prior art embodiment of FIG. 1, the charge air cooler units of the present invention are quite different in that they are either up or down flow units, and not cross flow units. Thus, as shown in FIG. 5, the entering heated compressed charge air 50 flows through manifold 34a and downward 52 to be cooled in core 37a, made up of otherwise conventional tubes and cooling fins, and collected into a lower manifold 34b. This compressed charge air 54 is then transferred to the upper manifold 34c of lower CAC unit 32, where the now partially cooled charge air 56 then flows downward through core 37b, into lower manifold 34d, and out as cooled compressed air 58 to be routed to the engine air intake manifold.

Figure 2:
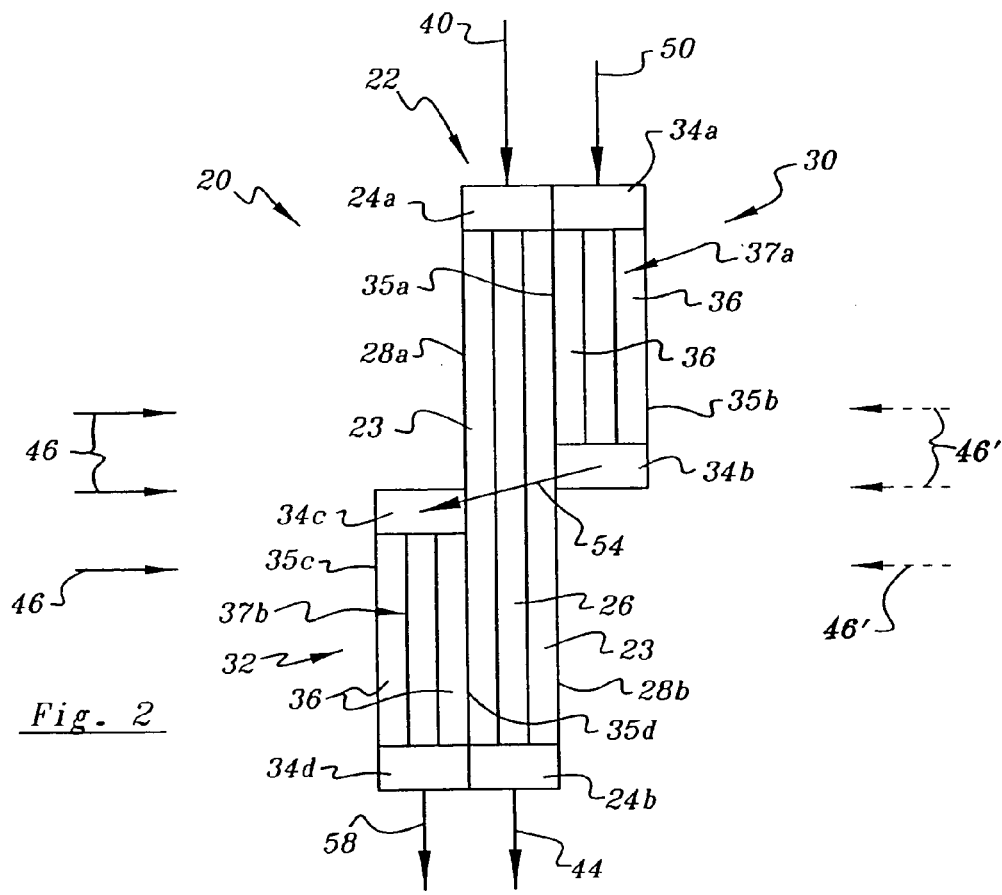
FIG. 2 is a side elevational view of one embodiment of the radiator/charge air cooler heat exchanger package of the present invention.
Figure 4:
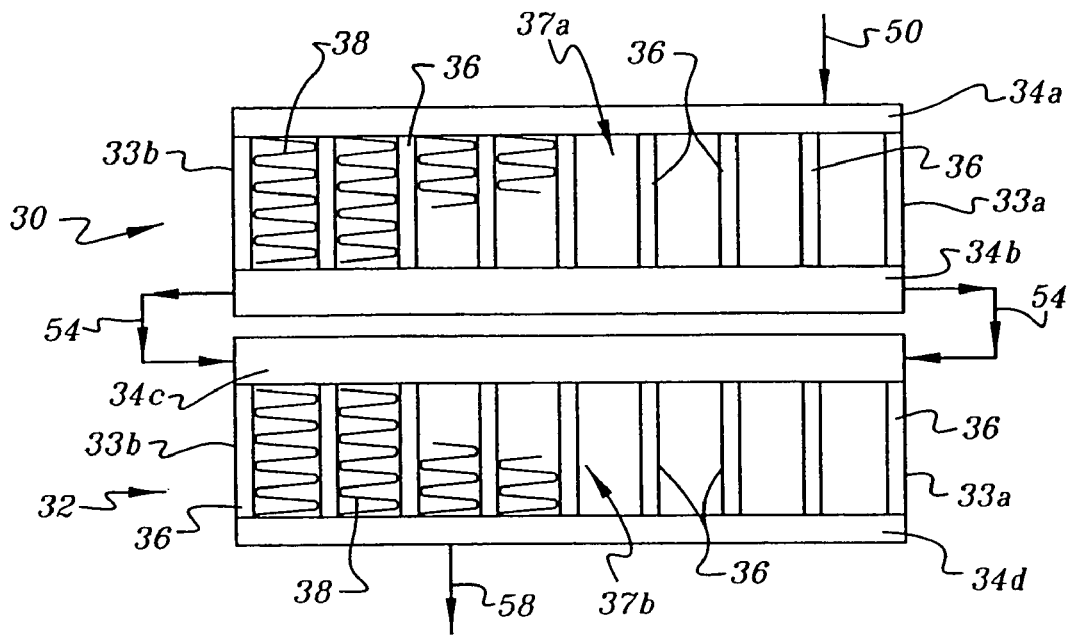
FIG. 4 is a front elevational view of the charge air cooler portion of the heat exchanger package of FIG. 2, without the radiator, and showing cooling fins over only a portion of the tubes of the core.

As shown in more detail in FIG. 4, each of the cores 37a, 37b for the CAC units 30, 32 comprise spaced, vertically extending tubes 36, between which are disposed serpentine cooling fins 38, oriented to permit air flow through the unit. Such fins should extend between all of the tubes in the core. These tubes may be two (2) rows deep, as shown in FIG. 2, or any other configuration. Both charge air cooler units 30 and 32 have a horizontal width, measured in the direction of the manifolds, which is greater than the vertical height of each of the units, measured between the manifolds. Improved heat exchanger package performance, and in particular, improved performance of the charge air cooler units, has been found by utilizing tubes 36 which are as short as possible and as numerous as possible, given the configuration of the charge air cooler unit. As shown in this embodiment, charge air cooler units 30 and 32 employ tubes 36 which are oriented with the shorter vertical height of each of the units so that there are a larger number of shorter tubes, as contrasted to the smaller number of longer tubes as used in the cross flow CAC unit of FIG. 1.

Heat exchanger cores 26, 37a, 37b can be constructed of typical materials, for example aluminum, brass or copper tubes and fins. Manifolds 24a, 24b, 34a, 34b, 34c, 34d may be any conventional materials such as plastic, aluminum, brass or copper.

Figure 6:
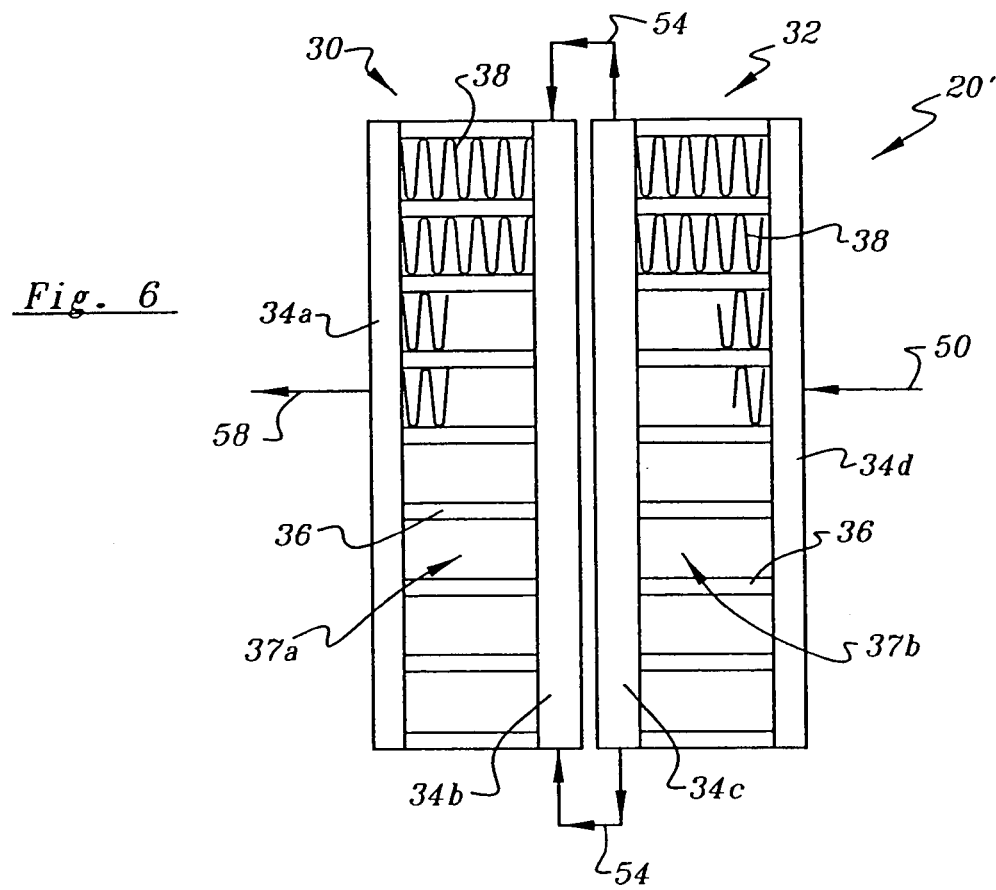
FIG. 6 is a front elevational view of the charge air cooler portion of an alternate heat exchanger package, without the radiator, and showing cooling fins over only a portion of the tubes of the core.
Figure 7:
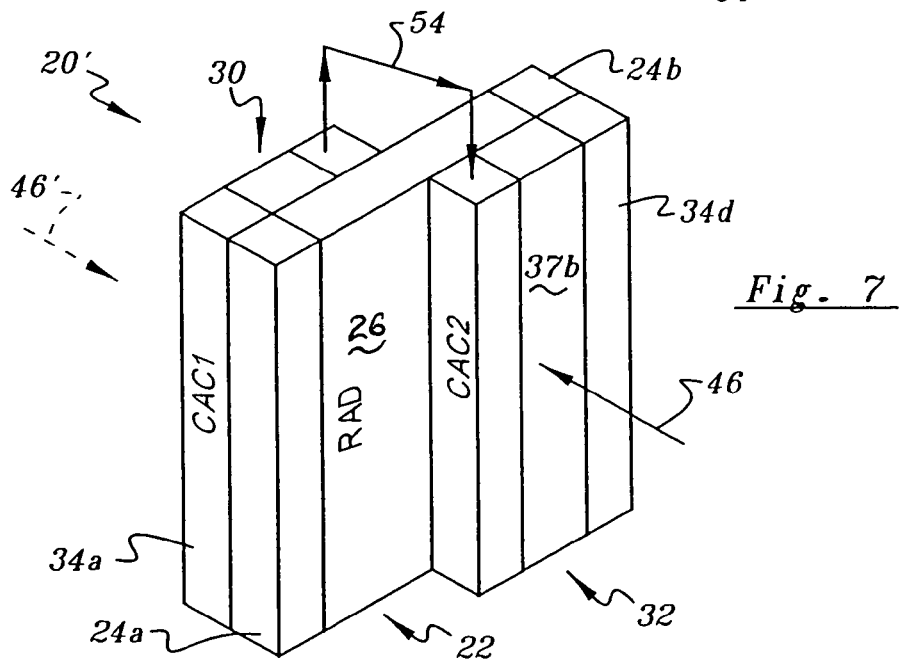
FIG. 7 is a perspective view of the radiator incorporated with the charge air cooler in the alternate heat exchanger package depicted in FIG. 6.

FIGS. 6 and 7 depict another embodiment 20' of the present invention which is structurally identical to the previous embodiment, with the difference being that the radiator and charge air cooling units are rotated 90°, so that the CAC units are horizontally separated. As before, manifolds 24a, 24b of radiator 22 may be oriented in the same direction as manifolds 34a, 34b, 34c, 34d of CAC units 30 and 32. In this embodiment, all of the manifolds of the radiator and charge air cooler units are vertically oriented and horizontally spaced and, consequently, the fluid flow through the now horizontal tubes within the cores of the respective radiator and charge air cooler units is now horizontal. However, the performance of the heat exchanger package in the embodiment of FIGS. 6 and 7 is the same as that in the embodiment of FIGS. 2-5 since the charge air cooler tubes are as short and as numerous as possible given that the horizontal width of the each charge air cooler unit is less than its vertical height. Alternatively, when the pressure drop of the coolant in the radiator is not critical, the radiator can remain as a downflow unit as in FIGS. 1-5, while CACs 30,32 are rotated 90° to the position shown in FIGS. 6 and 7.

FIG. 8 depicts the heat exchanger package 20, 20' of the previous embodiments in relation to a cooling suction fan having fan blades 62 powered by a fan motor 60. The heat exchanger package 20, 20' is in line with the area swept by the fan blades to move the outside ambient cooling air 46 through each of the CAC units 30, 32 and radiator 22. Preferably, CAC manifolds 34b, 34c are positioned in line with the center of the fan blades 62 and fan motor 60, where airflow is low or nearly zero. A fan shroud (not shown) may be positioned circumferentially around the fan blades and the heat exchanger package top and side edges to contain and direct the airflow. In operation, ambient cooling air 46 presented to approximately half of the heat exchanger package 20 or 20' flows sequentially and in series through the free front face 28a of radiator core 26 (shown at the upper end), out through the rear face 28b and, now having been heated to above ambient temperature, then immediately flows through adjacent front face 35a of CAC unit 30. After passing through CAC core 37a, the cooling air passes out through rear face 35b. In the other approximately half of heat exchanger package 20 or 20' (shown at the lower end), ambient air 46 flows sequentially and in series through front face 35c of core 37b of CAC unit 32, and out of CAC rear face 35d and, now having been heated to above ambient temperature, then immediately through adjacent face 28a of radiator 22. After passing through the lower portion of radiator core 26, the ambient cooling air then exits through free rear face 28b of radiator 22. Notwithstanding the fact that it is heated as it passes through the fins of the radiator and CAC units, unless otherwise specified, the term ambient air includes all of the cooling air as it passes through heat exchanger package.

The operational flow of fluid to be cooled is such that, as shown in FIG. 5, the initially hot engine coolant 40 is received in the upper portion of radiator 22 and cooled as it passes downward 42 through radiator core 26, given that ambient air 46 is at a lower temperature than the incoming engine coolant 40. Incoming compressed charge air 50 is normally at a higher temperature than the incoming engine coolant, and is initially passed through upper charge air cooler unit 30. This heated charge air flows through core 37a and is then cooled by air 46, after that air passes through and is heated by the upper portion of radiator core 26. The partially cooled compressed charge air 54 then passes from lower manifold 34b to upper manifold 34c of lower CAC unit 32. CAC unit 32 is in front of the lower portion of radiator 22 with respect to the cooling air flow, and as the charge air 56 passes downward through core 37b, it is cooled by the fresh ambient air before it passes out through manifold 34d of CAC unit 32 as cooled compressed air 58, which is then routed to the air intake manifold of the engine.

The flow of ambient cooling air may be reversed for the embodiments described herein, so that it flows in direction 46' (FIGS. 5 and 7). To accomplish this, a blower fan may be used in place of the suction fan to blow air first through the fan and then through the heat exchanger package. Additionally, the flow of fluids to be cooled may be reversed from that described above. The cooling performance of the heat exchanger package, including the CAC units, has been determined to be substantially the same when reversing the flow of the ambient cooling air, so that it flows in direction 46', and/or reversing the flow of the charge air, so that the charge air enters through manifold 34d and exits through manifold 34a.

Figure 3:
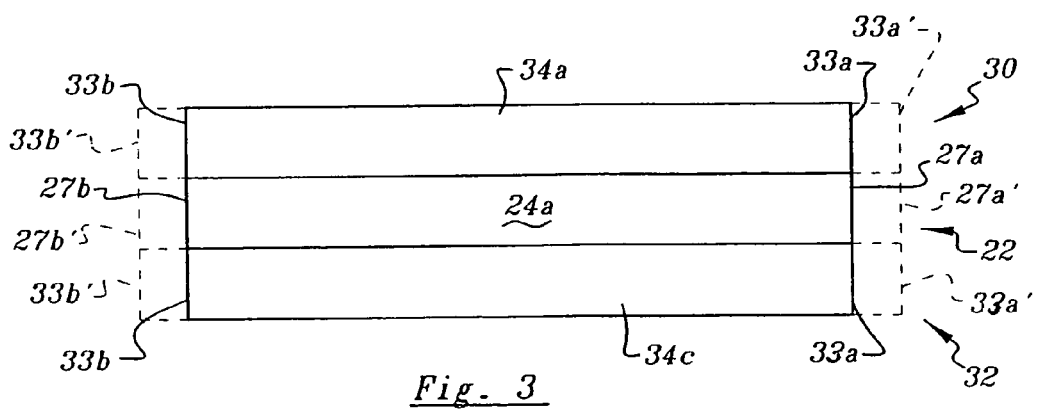
FIG. 3 is a top plan view of the radiator of the radiator/charge air cooler package of FIG. 2.

Although in the preferred embodiment of the present invention, there are no non-overlapping regions between the top, bottom or sides of the radiator and the corresponding top, bottom and sides of the CAC units, the heat exchanger package of the present invention may include such non-overlapping regions. For example, as shown in FIG. 8, radiator ends 25a' or 25b' adjacent manifolds 24a, 24b, respectively, may extend above and below the corresponding charge air cooler unit ends 39a, 39d, adjacent manifolds 34a, 34d, respectively. Alternatively, ends 39a', 39d' of the charge air cooler units may extend above and below the upper and lower ends of the radiator 25a, 25b. As shown in FIG. 3, it is also possible for there to be non-overlapping regions along the sides of the heat exchanger package. One or both of radiator sides 27a', 27b' may extend beyond the sides of the heat exchanger units 33a, 33b. Alternatively, any of the charge air cooler sides 33a', 33b' may extend beyond the sides of radiator sides 27a, 27b. If any such non-overlapping regions are used, the portions of either of the charge air cooler units or radiator extending beyond and behind the other will then receive fresh ambient air. Additional heat exchangers typically employed in motor vehicles may be used in the heat exchanger package of the present invention, such as oil and transmission coolers, and secondary charge air coolers units may also be used, either in front of or behind upper or lower portions of the package.

A preferred embodiment of the manifold connection between the charge air cooler units is depicted in FIG. 9. CAC unit 30 has on it a lower end manifold 34b, and CAC unit 32 has on its upper end manifold 34c. As depicted manifolds 34*b* and 34*c* are connected around both opposing side edges of radiator 22 by connecting conduits 31*a*, 31*b*, which pass the partially cooled compressed charge air 54 from CAC unit 30 to CAC unit 32.

Figure 10:
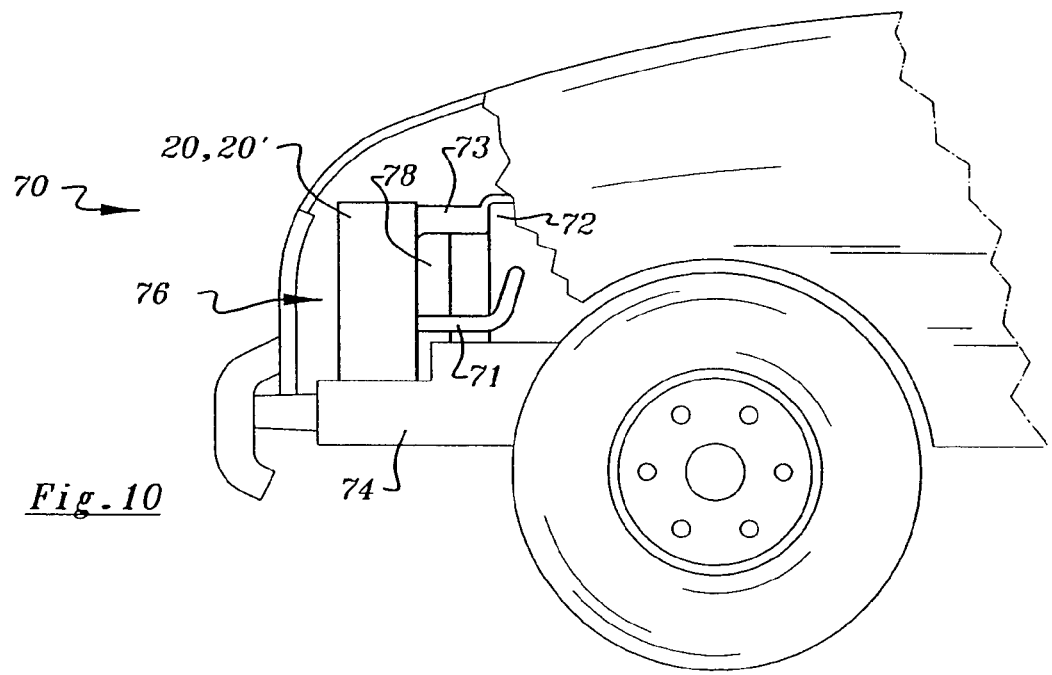
FIG. 10 is a side elevational view, partially cut away, showing the combined radiator/charge air cooler heat exchanger combination of the present invention mounted under the hood of a highway truck.
Figure 11:
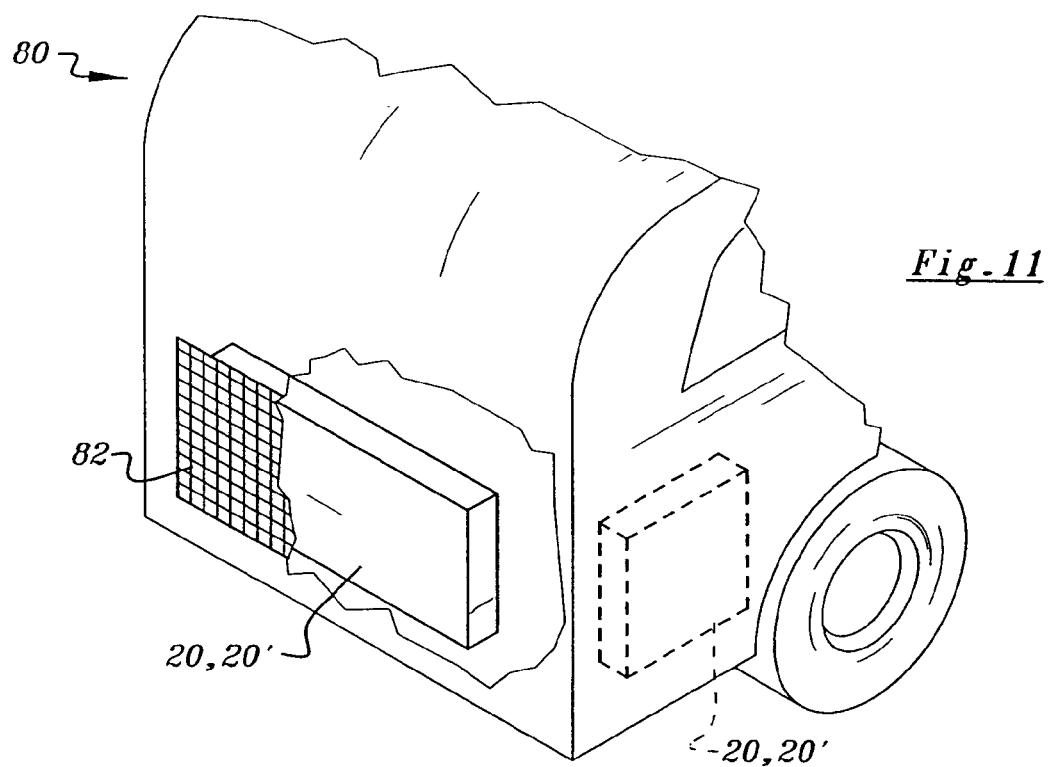
FIG. 11 shows alternate locations of the combination radiator/charge air cooler heat exchanger package of the present invention mounted in the rear of a highway bus.

Referring to FIG. 10, a heavy duty highway truck 70 is shown including engine 72 located in engine compartment 76 at the front portion of the truck. The vehicle includes a lower frame 74 having the combined radiator/CAC heat exchanger package 20, 20' mounted vertically at the front end of engine compartment 74. The fan is mounted within fan shroud 78 positioned behind the heat exchanger package. The radiator and charge air cooler are operatively connected to engine 72 by hoses 71, 73, respectively, which provide the engine coolant and engine charge air. FIG. 11 depicts the heat exchanger package of the invention 20, 20' mounted at the rear of a bus behind grill 82, or at the side near the rear (in phantom lines).

Models of the present invention heat exchanger package as compared to the prior art of FIG. 1 have shown significant reduction in hot side air flow charge air pressure drop of a turbocharged engine, with an insignificant increase in charge air and coolant temperatures. Such increased performance is shown in such models even at high charge air flow rates.

Thus, the heat exchanger package of the present invention provides a combination radiator and charge air cooler which achieves high heat transfer performance with a minimal frontal area, while minimizing pressure loss to the fluids. It is particularly useful to cooling fluids such as engine coolant and charge air used in the engine of a heavy duty truck, highway bus or other motor vehicle. In particular, the combination radiator and charge air cooler heat exchanger package disclosed herein satisfies the requirements of these vehicles for low charge air pressure drops, to obtain maximum performance from their turbo- and supercharges, while still providing satisfactory cooling to the engine coolant and charge air. Additionally, these vehicles often operate in high altitudes and low air density, which the heat exchanger package of the present invention is able to accommodate.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

What is claimed is:

1. A method for cooling fluids used in an engine of a motor vehicle, comprising:
   providing a heat exchanger assembly comprising:
      a radiator for cooling engine coolant having opposite front and rear faces through which cooling air flows, opposite upper and lower ends adjacent the faces, and sides adjacent the faces between the upper and lower ends;
      a charge air cooler for cooling charge air having upper and lower portions, each charge air cooler portion having opposite front and rear faces through which cooling air flows, opposite upper and lower ends adjacent the faces, and sides adjacent the faces between the upper and lower ends, and including upper and lower manifolds extending across the upper and lower ends, respectively, of each charge air cooler portion, and fluid-carrying tubes extending substantially directly between the upper and lower manifolds of each charge air cooler portion,
      the upper charge air cooler portion being disposed in overlapping relationship and adjacent to the upper end of the radiator with the upper and lower ends of the upper charge air cooler portion being oriented in the same direction as the upper and lower ends of the radiator, wherein the rear face at the upper end of the radiator is disposed adjacent the front face of the upper charge air cooler portion and the upper manifold of the upper charge air cooler portion is disposed adjacent the upper end of the radiator, cooled compressed charge air exiting the charge air cooler through the upper manifold of the upper charge air cooler portion,
      the lower charge air cooler portion being disposed in overlapping relationship and adjacent to the lower end of the radiator with the upper and lower ends of the lower charge air cooler portion being oriented in the same direction as the upper and lower ends of the radiator, wherein the front face at the lower end of the radiator is disposed adjacent the rear face of the lower charge air cooler portion and the lower manifold of the lower charge air cooler portion is disposed adjacent the lower end of the radiator, the lower manifold of the lower charge air cooler portion receiving incoming compressed charge air to the charge air cooler, the lower end of the upper charge air cooler portion being in line with and opposite the upper end of the lower charge air cooler portion,
      the charge air cooler portions being operatively connected by a conduit extending from the lower manifold at the lower end of the upper charge air cooler portion and around a side of the radiator, intermediate the radiator ends, to the upper manifold at the upper end of the lower charge air cooler portion such that the charge air may flow through the conduit between the lower manifold of the upper charge air cooler portion and the upper manifold of the lower charge air cooler portion;
   flowing the engine coolant through the radiator from the upper end to the lower end thereof;
   flowing the charge air in sequence in through the lower manifold of the lower charge air cooler portion, the tubes of the lower charge air cooler portion, the upper manifold of the lower charge air cooler portion, the conduit extending from the upper manifold of the lower charge air cooler portion and around a side of the radiator, intermediate the radiator ends, to the lower manifold of the upper charge air cooler portion, the lower manifold of the upper charge air cooler portion, the tubes of the upper charge air cooler portion, the upper manifold of the upper charge air cooler portion, and to an air intake manifold of the engine; and
   flowing cooling air through the heat exchanger assembly such that the cooling air flows sequentially first through the lower end of the radiator and subsequently through the lower charge air cooler portion, and the cooling air also flows sequentially first through the upper charge air cooler portion and subsequently through the upper end of the radiator, to cool the engine coolant in the radiator and the charge air in the charge air cooler portions.

2. The method of claim 1 wherein the dimension between the upper and lower ends of the charge air cooler portions is less than the dimension from one side of the charge air cooler portions to the other side of the charge air cooler portions, such that the fluid-carrying tubes extend across the shorter dimension of the faces of the charge air cooler portions, and wherein, in each charge air cooler portion, the charge air flows between the upper manifold and the lower manifold through the tubes extending across the shorter dimension of the face thereof.

3. The method of claim 1 wherein the radiator includes fluid-carrying tubes extending in the same direction as the fluid-carrying tubes of each of the charge air cooler portions, and wherein the engine coolant flows through the radiator fluid-carrying tubes.

4. The method of claim 1 further providing at least one of the sides or ends of the radiator extending outward of a side or end of one of the charge air cooler portions, and wherein the cooling air flows through the outwardly-extending radiator side or end without flowing through the charge air cooler portions.

5. The method of claim 1 further providing the upper end of the radiator extending outward of the upper end of the upper charge air cooler portion, and wherein the cooling air flows through the outwardly-extending radiator upper end without flowing through the charge air cooler portions.

6. The method of claim 1 further providing the upper end of the radiator extending outward of the upper end of the upper charge air cooler portions and the lower end of the radiator extending outward of the lower end of the lower charge air cooler portion, and wherein the cooling air flows through the outwardly-extending radiator upper and lower ends without flowing through the charge air cooler portions.

7. The method of claim 1 further providing at least one of the sides or ends of one of the charge air cooler portions extending outward of a side or end of the radiator, and wherein the cooling air flows through the outwardly-extending charge air cooler sides or ends without flowing through the radiator.

8. The method of claim 1 wherein the charge air cooler portions are operatively connected by conduits such that the charge air may flow between the upper manifold of the lower charge air cooler portion and the lower manifold of the upper charge air cooler portion around both sides of the radiator, intermediate the radiator ends.

* * * * *